United States Patent
Laur et al.

(10) Patent No.: US 10,037,696 B2
(45) Date of Patent: Jul. 31, 2018

(54) COOPERATIVE AUTOMATED VEHICLE SYSTEM

(71) Applicant: Delphi Technologies, Inc., Troy, MI (US)

(72) Inventors: Michael H. Laur, Mission Viejo, CA (US); John P. Absmeier, Capitola, CA (US); Nandita Mangal, Palo Alto, CA (US); Wu Dun, Sunnyvale, CA (US); Divya Agarwal, Sunnyvale, CA (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 15/086,815

(22) Filed: Mar. 31, 2016

(65) Prior Publication Data

US 2017/0287331 A1    Oct. 5, 2017

(51) Int. Cl.
   *G08G 1/16* (2006.01)
(52) U.S. Cl.
   CPC ..................... *G08G 1/161* (2013.01)
(58) Field of Classification Search
   CPC .............................................. G08G 1/161
   See application file for complete search history.

(56) References Cited

U.S. PATENT DOCUMENTS

| | | | |
|---|---|---|---|
| 5,244,055 A * | 9/1993 | Shimizu | G05D 1/0263 180/168 |
| 5,761,630 A * | 6/1998 | Sekine | B60W 40/04 340/903 |
| 5,845,725 A | 12/1998 | Kawada | |
| 6,292,725 B1 | 9/2001 | Kageyama et al. | |

(Continued)

FOREIGN PATENT DOCUMENTS

| | | | | |
|---|---|---|---|---|
| JP | 3123312 B2 | 1/2001 | | |
| WO | WO 2015114592 A1 * | 8/2015 | ............ | B60W 30/06 |

OTHER PUBLICATIONS

Manaei, et al, "Adaptive Content Control for Communication amongst Cooperative Automated Vehicles", published Sep. 2014, 978-1-4799-4452-1/14, 2014 IEEE, 7 pages.

(Continued)

*Primary Examiner* — Khoi H Tran
*Assistant Examiner* — Majdi Alsomiri
(74) *Attorney, Agent, or Firm* — Lawrence D. Hazelton

(57) ABSTRACT

A cooperative-vehicle system suitable to operate an automated vehicle in a courteous or cooperative manner includes an object-detector and a controller. The object-detector is used by the host-vehicle to detect an other-vehicle attempting to enter a travel-lane traveled by the host-vehicle. The controller is in communication with the object-detector. The controller is configured to control motion of the host-vehicle. The controller is also configured to adjust a present-vector of the host-vehicle to allow the other-vehicle to enter the travel-lane. The decision to take some action to allow the other vehicle to enter the travel-lane may be further based on secondary considerations such as how long the other-vehicle has waited, a classification of the other-vehicle (e.g. an ambulance), an assessment of how any action by the host-vehicle would affect nearby vehicles, the intent of the other-vehicle, and/or a measure traffic-density proximate to the host-vehicle.

9 Claims, 3 Drawing Sheets

(56) References Cited

U.S. PATENT DOCUMENTS

| | | | | |
|---|---|---|---|---|
| 7,260,465 | B2* | 8/2007 | Waldis | B60K 31/0008 340/905 |
| 8,214,125 | B2* | 7/2012 | Nanami | B60W 40/04 180/179 |
| 8,788,134 | B1* | 7/2014 | Litkouhi | B62D 15/0255 701/23 |
| 9,547,986 | B1* | 1/2017 | Curlander | G08G 1/09 |
| 2005/0015203 | A1* | 1/2005 | Nishira | G08G 1/167 701/301 |
| 2005/0143889 | A1* | 6/2005 | Isaji | G08G 1/161 701/70 |
| 2007/0142995 | A1* | 6/2007 | Wotlermann | B60K 31/0008 701/96 |
| 2009/0082917 | A1* | 3/2009 | Adachi | G08G 1/0104 701/420 |
| 2011/0130964 | A1* | 6/2011 | Kitagawa | G01C 21/3697 701/301 |
| 2011/0133957 | A1 | 6/2011 | Harbach et al. | |
| 2011/0184605 | A1* | 7/2011 | Neff | G05D 1/0231 701/25 |
| 2012/0330540 | A1* | 12/2012 | Ozaki | G06Q 10/047 701/117 |
| 2013/0054106 | A1* | 2/2013 | Schmudderich | B60W 30/0956 701/96 |
| 2013/0099911 | A1* | 4/2013 | Mudalige | G08G 1/163 340/438 |
| 2013/0325241 | A1* | 12/2013 | Lombrozo | B60W 40/00 701/23 |
| 2014/0063232 | A1* | 3/2014 | Fairfield | G06K 9/78 348/118 |
| 2014/0195093 | A1* | 7/2014 | Litkouhi | B62D 15/0255 701/23 |
| 2014/0330479 | A1* | 11/2014 | Dolgov | B60W 30/16 701/28 |
| 2015/0100216 | A1* | 4/2015 | Rayes | B60W 30/143 701/96 |
| 2016/0025502 | A1 | 1/2016 | Lacaze et al. | |
| 2016/0161270 | A1* | 6/2016 | Okumura | G01C 21/34 701/23 |
| 2016/0280264 | A1* | 9/2016 | Baek | B62D 15/0255 |
| 2017/0131719 | A1* | 5/2017 | Micks | B60W 40/08 |

OTHER PUBLICATIONS

Hobert, et al, "Enhancements of V2Z Communication in Support of Cooperative Autonomous Driving", Toward Autonomous Driving: Advances in V2X Connectivity, IEEE Communications Magazine, Dec. 2015, pp. 64-70.

* cited by examiner

COOPERATIVE AUTOMATED VEHICLE SYSTEM

TECHNICAL FIELD OF INVENTION

This disclosure generally relates to a cooperative-vehicle system suitable to operate an automated vehicle, and more particularly relates to a system that operates a host-vehicle in a cooperative or courteous manner to allow an other-vehicle to enter the travel-lane of the host-vehicle.

BACKGROUND OF INVENTION

It is known that traffic congestion can make it difficult to enter a roadway or travel-lane from, for example, a parking-space, or a driveway to a home or business.

SUMMARY OF THE INVENTION

Described herein a cooperative-vehicle system that stops or otherwise maneuvers a host-vehicle to allow or make-way for an other-vehicle to, for example, emerge from a side-street or parking lot in a high traffic zone, back onto a congested street from a driveway or parking spot, or merge into a congested traffic-lane. For instance, in a merge situation, the host-vehicle may speed-up or slow-down to create a gap in traffic into which the other-vehicle can merge. The other-vehicle maybe an automobile, manually driven or autonomous, a cyclist, or a pedestrian. In some instances the other-vehicle may merely cross the travel-lane of the host-vehicle rather than begin traveling in the travel-lane in presumable the same direction as the host-vehicle.

In accordance with one embodiment, a cooperative-vehicle system suitable to operate an automated vehicle in a cooperative or courteous manner is provided. The system includes an object-detector and a controller. The object-detector is used by the host-vehicle to detect an other-vehicle attempting to enter a travel-lane traveled by the host-vehicle. The controller is in communication with the object-detector. The controller is configured to control motion of the host-vehicle. The controller is also configured to adjust a present-vector of the host-vehicle to allow the other-vehicle to enter the travel-lane.

In another embodiment, the object-detector is used by the controller to determine a wait-time that the other-vehicle has waited to enter the travel-lane, and the controller is further configured to adjust the present-vector of the host-vehicle to allow the other-vehicle to enter the travel-lane when the wait-time is greater than a time-threshold.

In yet another embodiment, the object-detector is used by the controller to determine a traffic-density of the travel-lane, and the controller is further configured to adjust the present-vector of the host-vehicle to allow the other-vehicle to enter the travel-lane when the traffic-density is greater than a density-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
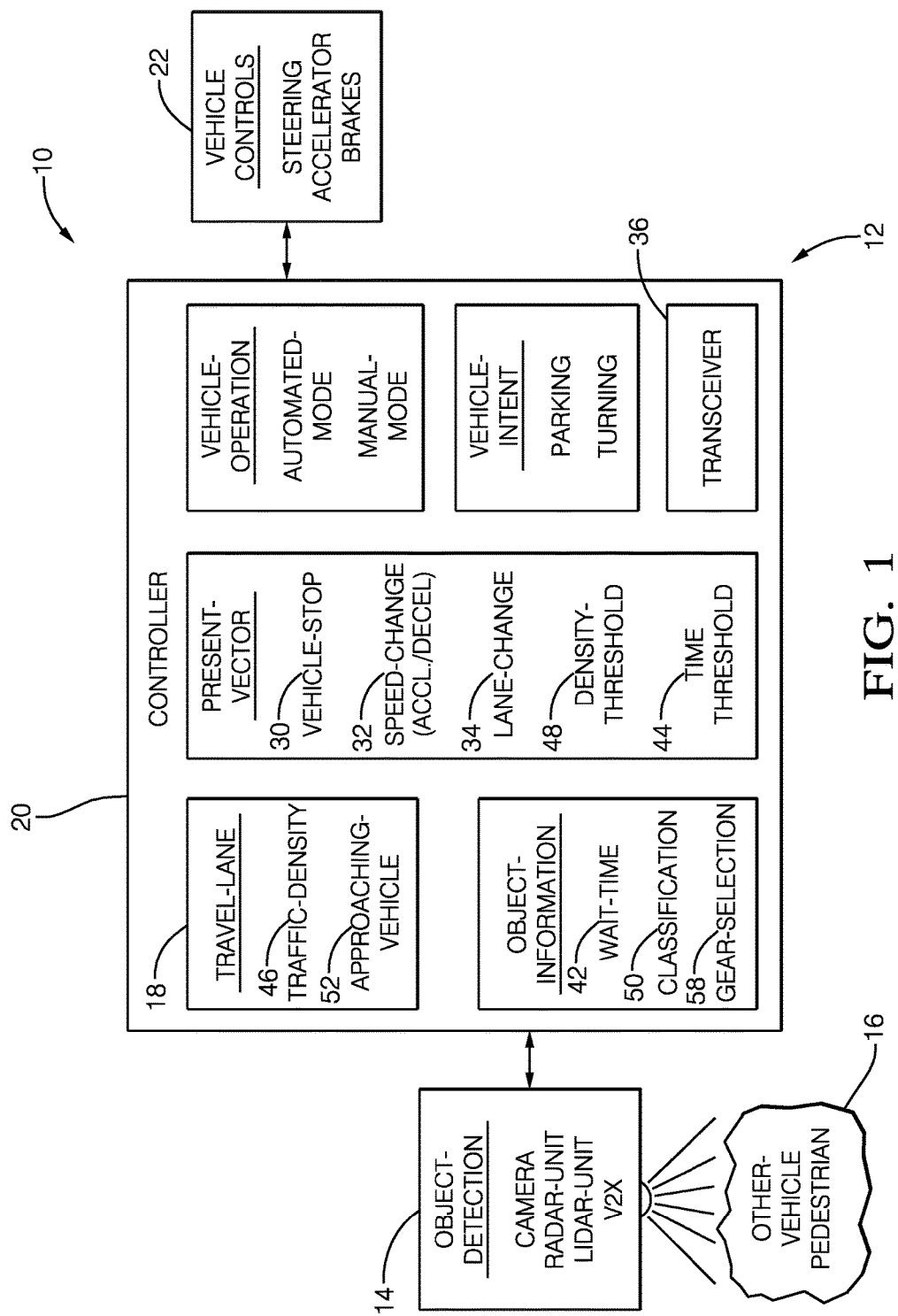
FIG. 1 is a diagram of a cooperative-vehicle system in accordance with one embodiment.

FIG. 1 illustrates a non-limiting example of a cooperative-vehicle system 10, hereafter the system 10, suitable to operate an automated vehicle, for example a host-vehicle 12. In general, the system 10 described herein is distinguished from known systems for operating an automated or autonomous vehicle (e.g. the host-vehicle 12) by being configured to behave in a manner characterized as cooperative or courteous to pedestrians and other vehicles proximate to the host-vehicle 12, including manually operated and other autonomous or automated vehicles, as will become apparent in the description that follows.

The system 10 generally includes an object-detector 14 used by the host-vehicle 12 to detect an other-vehicle 16 attempting to enter a travel-lane 18 (also see FIGS. 2-4) traveled by the host-vehicle 12. In one embodiment, it is envisioned that the object-detector 14 may be, for example, but not limited to, a camera, radar-unit, lidar-unit, or any combination thereof, which may be mounted on the host-vehicle 12. Alternatively, the actual sensing or detecting of the other-vehicle 16 may be done by, for example, but not limited to, a camera, radar-unit, lidar-unit, or any combination thereof, which is not mounted on the host-vehicle 12, but is positioned at some remote location nearby the host-vehicle 12. Information from these exemplary remote devices may be communicated to the host-vehicle 12 by way of vehicle-to-vehicle (V2V) communications from other suitably equipped vehicles proximate to the host-vehicle 12, and/or vehicle-to-infrastructure (V2I) communications from, for example, traffic observation cameras and the like. V2V and V2I communications are sometimes generically referred to as V2X (X for unknown or whatever) communications or V2E (E for everything) communications.

While the description of the system 10 provided herein generally assumes that the other-vehicle 16 is an actual vehicle, i.e. and automobile, it is also contemplated that the cooperative or courteous behavior exhibited by the host-vehicle 12 could also be applicable to other objects proximate to the host-vehicle 12 such as a pedestrian or bicyclist attempting to cross the travel lane 18, construction equipment operating near or on the travel-lane 18, or even an animal such as wild-animal, domesticated livestock, or a pet.

The system 10 also generally includes a controller 20 configured to be in communication with the object-detector 14 via, for example, a wired or wireless connection. The controller 20 may include a processor (not specifically shown) such as a microprocessor or other control circuitry such as analog and/or digital control circuitry including an application specific integrated circuit (ASIC) for processing data as should be evident to those in the art. The controller 20 may include memory (not specifically shown), including non-volatile memory, such as electrically erasable programmable read-only memory (EEPROM) for storing one or more routines, thresholds, and captured data. The one or more routines may be executed by the processor to perform steps for determining information about the other-vehicle 16 based on signals received by the controller 20 for operating the host-vehicle 12 as described herein.

The controller 20 is generally configured to control motion (e.g. steering, acceleration, and/or braking) of the host-vehicle 12 by way of vehicle-controls 22, e.g. operate the steering, accelerator, and/or brakes of the host-vehicle, as will be recognized by those in the art. The vehicle-controls 22 may be configured to be operated solely by the controller 20 if the host-vehicle 12 is operated in a fully-autonomous mode where any occupant of the host-vehicle 12 has little or no influence on the vehicle-controls 22. Alternatively, the host-vehicle 12 maybe operable in a partially automated mode where operation of the vehicle-controls is shared between the controller 20 and an occupant (not shown) of the host-vehicle 12.

Figure 2:
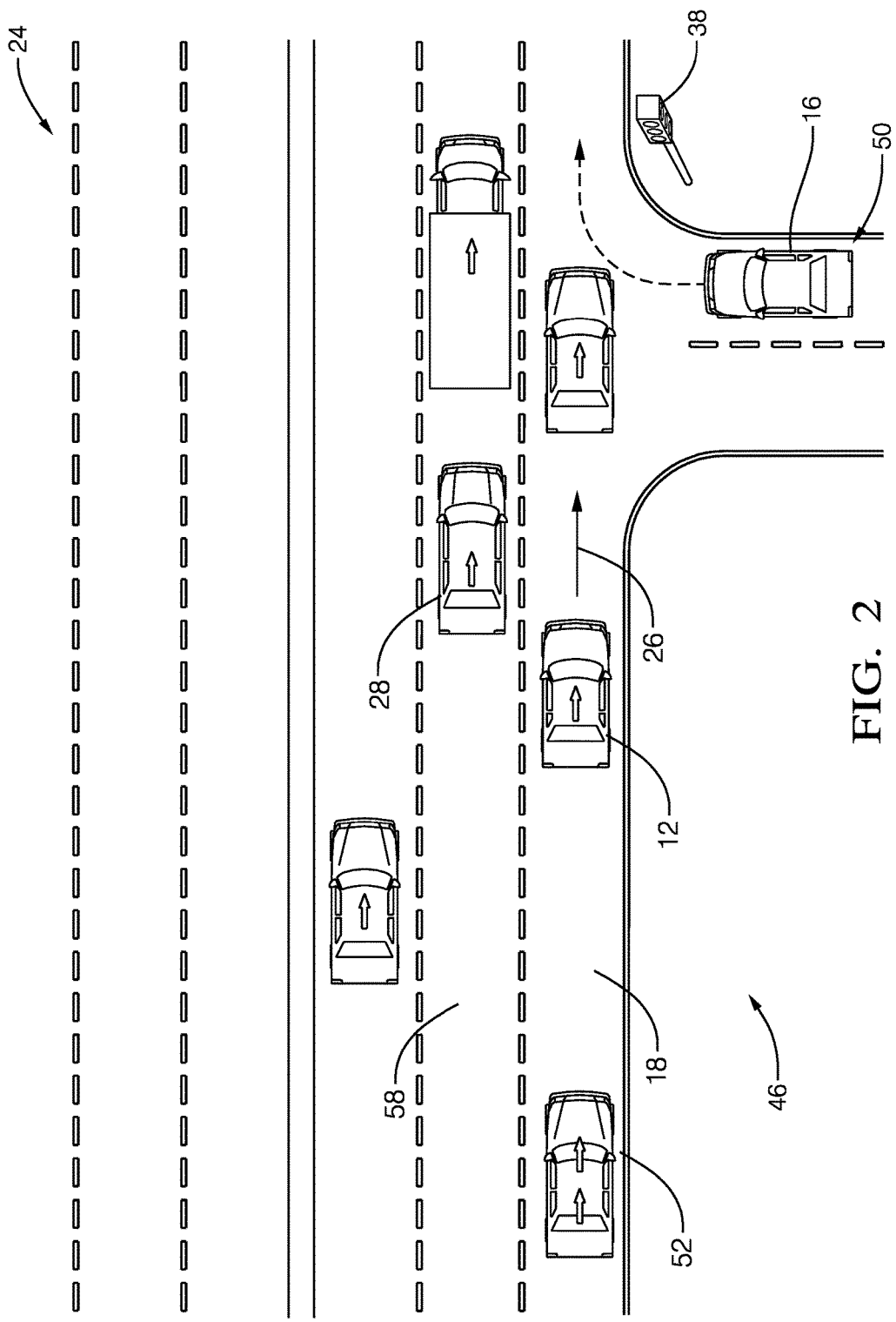
FIG. 2 is a traffic-scenario encountered by the system of FIG. 1 in accordance with one embodiment.

FIG. 2 illustrates a non-limiting example of a traffic-scenario 24 where the host-vehicle 12 is traveling in the travel-lane 18, and the motion of the host-vehicle 12 is characterized by a present-vector 26. As used herein, the present-vector 26 may be indicative of speed, direction, longitudinal-acceleration (note: acceleration includes deceleration), lateral-acceleration, or any combination thereof, as will be recognized by those in the art. As will be explained in more detail below, the system 10, or more specifically the controller 20, is advantageously configured to adjust a present-vector 26 of the host-vehicle 12 to allow the other-vehicle 16 to enter the travel-lane 18 and thereby exhibit cooperative or courteous behavior toward the other-vehicle 16. By way of example and not limitation, the controller 20 may adjust the present-vector 26 of the host-vehicle 12 by a variety of actions that include, but are not limited to, a vehicle-stop 30 (FIG. 1), a speed-change 32, a lane-change 34, and a combination of speed-change 32 and lane-change 34.

By way of further example and continuing to refer to FIG. 2, depending on the speeds of the various vehicles near by the host-vehicle 12, the host-vehicle 12 may elect to stop and wait (i.e. execute a vehicle-stop 30), or slow-down (i.e. execute a speed-change), or slow-down until there clearance behind the adjacent-vehicle 28 and then steer into the center-lane (i.e. execute a combination of speed-change 32 and lane-change 34) to provide time and space for the other-vehicle 16 enter the travel-lane 18. The decision on what action to take may be based on an evaluation of how much effect the action will have on the general flow of traffic around the host-vehicle 12. For example, if traffic is moving very slow, less than ten kilometers per hour (10 kph) for example, stopping the host-vehicle 12 would likely have little effect on the general flow of traffic. However, if traffic was moving at a moderate speed, sixty kilometers per hour (60 kph) for example, stopping may have an unacceptable effect on the flow of traffic, but slowing-down and changing-lanes to the center lane to a position behind the adjacent-vehicle 28 may not have a substantive effect. However, it is contemplated that there may be instances when changing lanes is undesirable; for example, when the host-vehicle 12 is planning to turn off the travel-lane 18 a short distance past where the other-vehicle 16 is waiting.

While one envisioned embodiment of the system 10 locates the object-detector 14 on the vehicle, it was also suggested that V2X communications could be used to convey information about the other-vehicle 16 to the controller 20 of the host-vehicle 12. Accordingly, the controller 20 may include a transceiver 36 used to communicate information about the other-vehicle to the controller 20. While FIG. 1 suggests that the transceiver 36 is built into the controller 20, this is not a requirement and those in the art will instantly recognize that the transceiver 36 could be located almost anywhere on the host-vehicle 12. When the host-vehicle 12 is equipped with the transceiver 36, then parts of the object-detector 14 such as the camera, radar-unit, and/or lidar-unit could be located or duplicated 'off-vehicle'.

That is, the host-vehicle may not have any means to directly detect the presence of the other-vehicle 16 so is completely reliant on those devices being accessible off-vehicle via V2X communications, or the system 10 may have a combination of devices both on-vehicle and off-vehicle. The off-vehicle devices such as a camera, radar-unit, and/or lidar-unit may be located proximate the travel-lane as part of a traffic-control system, where, for example, a camera could be mounted on a traffic-control-light 38 (FIG. 2) adjacent the travel-lane, and/or in one or more of the vehicles traveling proximate to the host-vehicle. This practice of drawing information from off-vehicle sensors or detectors via V2X communication is sometimes referred to as providing for 'extended layers of perception sensing'.

The controller 20 may be further configured to determine various types of object-information 40 that can be used to determine what form or type of action could or should be taken by the host-vehicle 12 to exhibit cooperative or courteous behavior toward the other-vehicle 16. It is contemplated that the object-detector 14 may be used by the controller 20 to determine a wait-time 42 that the other-vehicle 16 has waited to enter the travel-lane 18. The wait-time 42 could be determined by direct observation using, for example, a camera mounted on the host-vehicle 12. Alternatively, the wait-time 42 may be determined from images provided to the controller 20 via V2X communications from a camera that is mounted atop the traffic-control-light 38. As another alternative, the other-vehicle 16 may itself broadcast the wait-time 42 along with the present-location (e.g. GPS coordinates) of the other-vehicle 16, which would be received by the transceiver 36. The wait-time 42 and present-location could be used by the controller 20 to determine which vehicle is the other-vehicle 16 that is waiting.

Accordingly, the controller 20 may be further configured to adjust, in one of the various ways described above, the present-vector 26 of the host-vehicle 12 to allow the other-vehicle 16 to enter the travel-lane 18 when the wait-time 42 is greater than a time-threshold 44, where fifteen seconds (15 s) may be a suitable value for the time-threshold 44. That the wait-time 42 is greater than the time-threshold 44 may be used for a simple yes/no decision about taking some form of action, or how much the wait-time 42 is greater than the time-threshold 44 may influence what action is taken. I.e. more aggressive action such the lane-change 34 rather than merely the speed-change 32 may be selected if, for example, the wait-time 42 is greater than twice the time-threshold 44.

In another embodiment, the object-detector 14 may be used by the controller 20 to determine a traffic-density 46 of the travel-lane 18. By way of example and not limitation, the traffic-density 46 may be indicative of how many vehicles are present on, for example, one-hundred meters (100 m) of the travel-lane 18 forward of the host-vehicle 12 and/or one-hundred meters (100 m) of the travel-lane 18 behind of the host-vehicle 12. Alternatively, the traffic-density 46 may be an indication of the average spacing between one or more vehicles in front of and/or behind the host-vehicle 12. By way of non-limiting examples, the traffic-density 46 may be determined using direct observation from a camera on the host-vehicle 12, or by the transceiver 36 receiving images from a camera remote from the host-vehicle 12 via V2I communications, or by analyzing V2V communications from other vehicles proximate to the host-vehicle 12, or by any combination thereof. Accordingly, the controller 20 may be further configured to adjust, in one of the various ways described above, the present-vector 26 of the host-vehicle 12 to allow the other-vehicle 16 to enter the travel-lane 18 when the traffic-density 46 is greater than a density-threshold 48.

It is also contemplated that additional information about the other-vehicle 16 may be useful to determine a course of action for the host-vehicle 12 that seeks to minimize any disruptive effect an action may have on the general flow of traffic around the host-vehicle 12, and thereby allow the host-vehicle 12 to be courteous to all vehicles proximate to the host-vehicle 12. For example, the object-detector 14 may detect a turn-signal status or brake-status of the other-vehicle 16 using the camera or V2V communications, and the controller 20 may be further configured to determine a projected-path of the other-vehicle 16 and the course of action that has the least impact the overall flow of the traffic. If, for example, the other-vehicle 16 is traveling directly forward of the host-vehicle 12 in the right-lane of a multi-lane roadway, and the turn-signal status indicates that the other-vehicle 16 is about to make a right-turn off the roadway, the controller 20 may select between a) change lanes to go around the other-vehicle 16 as it slows in preparation to make the right-turn, or b) merely slow down and stay in the right-lane, depending on which action has the least impact the overall flow of the traffic.

In another embodiment, the object-detector 14 may be used by the controller 20 to determine a classification 50 of the other-vehicle 16. In some instances, the classification 50 of the other-vehicle 16 may warrant or justify taking a more aggressive form of action to allow the other-vehicle 16 to enter the travel-lane 18. By way of example and not limitation, examples of classifications include: emergency vehicles such as ambulances, fire-trucks, and police-vehicles, especially if the emergency lights on these vehicles are activated; public-transportation-vehicles such as busses; and unclassified, i.e. normal or typical, e.g. a personal passenger vehicle. An example situation is when the other-vehicle 16 is identified as an emergency-vehicle, and the emergency-lights of the emergency-vehicle are activated. In this instance the host-vehicle 12 may execute the vehicle-stop 30, which complies with traffic-laws in many jurisdictions. It is contemplated that the classification 50 of the other-vehicle 16 may be determined using means similar to those described above used to determine the traffic-density 46.

Another example situation is when the other-vehicle 16 is a public-transportation-vehicle. An increased amount of deference may be given to a public-transportation-vehicle such as a bus in order to help the public-transportation-vehicle maintain a schedule. As noted before, the object-information 40 regarding the classification 50 may be determined via, for example, direct observation by a camera mounted on the host-vehicle 12, a camera mounted on the traffic-control-light 38, V2X communication, and/or any combination thereof. Accordingly, the controller 20 is advantageously further configured to adjust the present-vector 26 to allow or give preference, indeed increased preference, to the other-vehicle 16 to enter the travel-lane 18 when the classification is one of an emergency-vehicle and a public-transportation-vehicle.

In another embodiment, the object-detector 14 may be used by the controller 20 to detect road-features and traffic-scenarios that suggest an obligation or requirement for the host-vehicle 12 to yield to the other-vehicle 16. For example, if the object-detector 14 determines that the host-vehicle 12 is approaching a "Keep Clear" zone, the object-detector 14 will observe the position and speed of the vehicles that are in the same travel-lane 18 and in front of host-vehicle 12, and controller 20 will decide if the host-vehicle 12 needs to adjust the present-vector 26 by stopping behind the "Keep Clear" zone. After stopping, object-detector 14 may detect the other-vehicle 26 attempting to enter the "Keep Clear" zone, and controller 20 may decide to remain stopped to courteously allow the other-vehicle 26 to enter the travel-lane 18. Other road-features that suggest an obligation or requirement that could help exhibit courteous and cooperative behaviors include, but are not limited to, yield signs, stop signs, and flashing red traffic lights.

In another embodiment, the object-detector 14 may be used by the controller 20 to detect an approaching-vehicle 52 that is approaching the host-vehicle 12 from behind. If it is determined that the approaching-vehicle 52 would likely be forced to decelerate at a rate greater than what might be deemed comfortable or possibly collide with the host-vehicle 12 if the host-vehicle 12 stopped (i.e. executed the vehicle stop 30) or slowed (i.e. executed a deceleration via the speed-change 32), the system 10 or more specifically the controller 20, may elect to not adjust the present-vector 26 in a manner that would allow the other-vehicle 16 to enter the travel-lane 18. That is, the controller 20 may be further configured to not stop when the approaching-vehicle 52 would be forced to decelerate at a rate greater than what is deemed comfortable or possibly collide with the host-vehicle 12 if the host-vehicle 12 stopped. It is contemplated that the rate of closure or absolute speed of the approaching-vehicle 52 may be determined using means similar to those described above used to determine the traffic-density 46 and classification 50. That is, the transceiver 36 may be used to communicate information about the approaching-vehicle to the controller 20.

Figure 3:
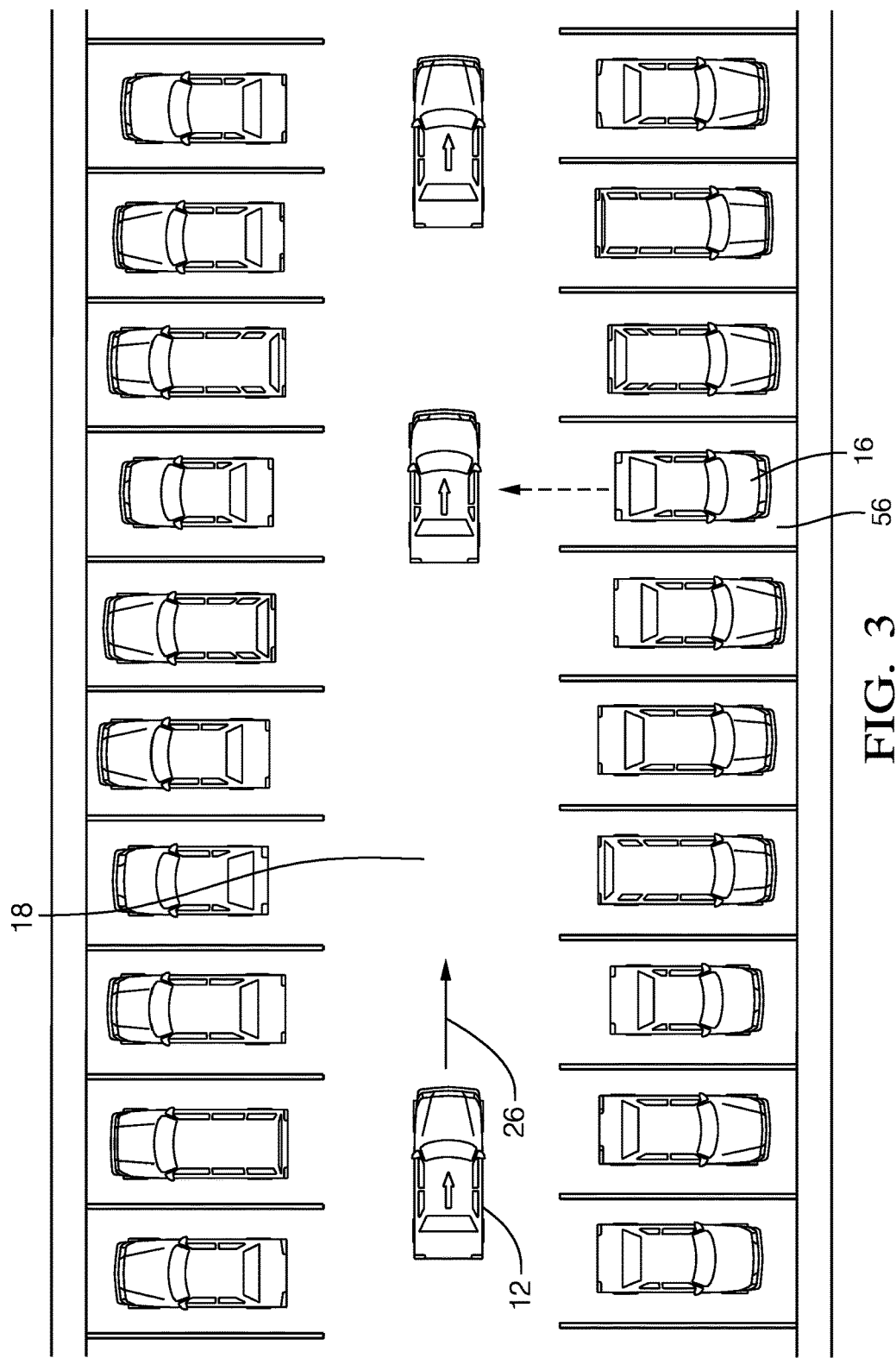
FIG. 3 is a traffic-scenario encountered by the system of FIG. 1 in accordance with one embodiment.

FIG. 3 illustrates a non-limiting example of another instance of a traffic-scenario 54 where vehicles are parked in parking-spots along the travel-lane where the parking-spots are oriented at right-angles to the travel-lane 18. Parking-spots oriented at other angles rather than right-angles are contemplated, including parallel parking-spots. In this instance of the traffic-scenario 54, the other-vehicle 16 is waiting to back out of a parking-spot 56 onto the travel-lane 18.

In another embodiment of the system 10, the object-detector 14 may be used by the controller 20 to detect a gear-selection 58 (FIG. 1) of the other-vehicle 16. For example, a camera may be used to detect when back-up lights of the other-vehicle 16 are illuminated, thereby indicating that the gear-selection of the other-vehicle 16 is reverse. Alternatively, the other-vehicle 16 may broadcast various bits of object-information 40 via V2V communications, including the gear-selection 58 of the other-vehicle 16. The controller 20 may be further configured to adjust the present-vector 26 of the host-vehicle 12 by, for example, executing a vehicle-stop 30 to allow the other-vehicle 16 to enter the travel-lane 18 when the gear-selection 58 is effective for the other-vehicle 16 to enter the travel-lane. In this example, if the gear-selection 58 is reverse, then the gear-selection 58 is effective for the other-vehicle 16 to enter the travel-lane when the other-vehicle 16 is facing forward into the parking-spot 56.

In another embodiment of the system 10, the transceiver 36 in the host-vehicle 12 may use V2V communications to broadcast that the host-vehicle 12 is searching for a place to park. As an example of two-way cooperation, the other-vehicle 16 may broadcast that the other-vehicle 16 is about to exit the parking-spot 56 that it currently occupies; or broadcast that it is presently waiting for traffic to clear so the other-vehicle 16 could exit the parking-spot 56. The host-vehicle 12 receives object-information 40 that includes an indication that the other-vehicle 16 is waiting to exit the parking-spot 56 and the present location of the other-vehicle 16. The controller 20 then adjusts the present-vector 26 of the host-vehicle 12 to allow the other-vehicle 16 to exit the parking-spot 56, and the host-vehicle 12 enters the parking-spot 56 as soon as the other-vehicle 16 is clear of the parking-spot 56. That is, when the controller 20 learns that the parking-spot 56 is about to be vacated or become available, the host-vehicle 12 may steer towards the location of the parking-spot 56, and, for example, momentarily block traffic so the other-vehicle 16 can exit the parking-spot 56.

Another traffic-scenario where the host-vehicle 12 could exhibit cooperative or courteous behavior is while the host-vehicle 12 is traveling on an expressway, and the other-vehicle 16 is traveling along an entrance-ramp and attempting to merge into the travel-lane 18 of the host-vehicle 12. If the arrangement of other vehicles on the expressway is such that the other-vehicle 16 does not have a clear-position in the flow of traffic into which the other-vehicle 16 could merge, the controller 20 may execute the speed-change 32 (i.e. speed-up or slow-down) and/or the lane-change 34 to create a clear-position in the arrangement of vehicles into which the other-vehicle can merge.

Accordingly, a cooperative-vehicle system (the system 10,) a controller 20 for the system 10 and a method of operating the system 10 is provided. The system 10, or more specifically the controller 20, operates the host-vehicle 12 in a manner that is cooperative with or courteous to other vehicles. That is, rather than merely control the host-vehicle 12 to reach a destination as soon as possible, the controller 20 is configured (i.e. programmed) to recognize instances where, for example, a momentary delay incurred by stopping the host-vehicle 12 to allow the other-vehicle 16 to enter the travel-lane 18 of the host-vehicle 12 is allowed, with the objective being to help the other-vehicle 16 to more readily reach the destination of the other-vehicle 16.

While this invention has been described in terms of the preferred embodiments thereof, it is not intended to be so limited, but rather only to the extent set forth in the claims that follow.

We claim:

1. A cooperative-vehicle system suitable to operate an automated vehicle, said system comprising:
    an object-detector used by the host-vehicle to detect an other-vehicle attempting to enter a travel-lane traveled by the host-vehicle;
    a controller in communication with the object-detector, said controller configured to control motion of the host-vehicle, determine a wait-time that the other-vehicle has waited to enter the travel-lane, and adjust a present-vector of the host-vehicle to allow the other-vehicle to enter the travel-lane when the wait-time is greater than a time-threshold, wherein the controller is further configured to stop the host-vehicle when the wait-time of the other-vehicle is greater than a time-threshold.

2. The system in accordance with claim 1, wherein the controller is configured to adjust the present-vector of the host-vehicle by one of a vehicle-stop, a speed-change, a lane-change, and a combination of speed-change and lane-change.

3. The system in accordance with claim 1, wherein the object-detector is used by the controller to determine a traffic-density of the travel-lane, and the controller is further configured to adjust the present-vector of the host-vehicle to allow the other-vehicle to enter the travel-lane when the traffic-density is greater than a density-threshold.

4. The system in accordance with claim 1, wherein the object-detector is used by the controller to determine a classification of the other-vehicle, and the controller is further configured to adjust the present-vector to allow the other-vehicle to enter the travel-lane when the classification is one of an emergency-vehicle and a public-transportation-vehicle.

5. The system in accordance with claim 1, wherein the object-detector is used by the controller to detect an approaching-vehicle approaching the host-vehicle from behind, and the controller is further configured to not stop the host-vehicle when the approaching-vehicle would collide with the host-vehicle if the host-vehicle stopped.

6. The system in accordance with claim 1, wherein the system includes a transceiver used to communicate information about the other-vehicle to the controller.

7. The system in accordance with claim 6, wherein the information includes a classification of the other-vehicle, and the controller is further configured to adjust the present-vector to allow the other-vehicle to enter the travel-lane when the classification is one of an emergency-vehicle and a public-transportation-vehicle.

8. The system in accordance with claim 6, wherein the transceiver is also used to communicate information about an approaching-vehicle approaching the host-vehicle from behind, and the controller is further configured to not stop the host-vehicle when the approaching-vehicle would collide with the host-vehicle if the host-vehicle stopped.

9. The system in accordance with claim 6, wherein the transceiver is also used to broadcast that the host-vehicle is searching for a place to park, receive an indication that the other-vehicle is waiting to exit a parking-spot, and the controller is further configured to adjust the present-vector of the host-vehicle to allow the other-vehicle to exit the parking-spot, and enter the parking-spot after the other-vehicle is clear of the parking-spot.

* * * * *